(12) United States Patent
Kroyan et al.

(10) Patent No.: US 9,486,713 B2
(45) Date of Patent: Nov. 8, 2016

(54) ROBOTIC ACTIVITY SYSTEM USING POSITION SENSING

(71) Applicant: Evollve, Inc., Redondo Beach, CA (US)

(72) Inventors: Armen Kroyan, Redondo Beach, CA (US); Ondřej Staněk, Prague (CZ); Nader Abou-Hamda, Redondo Beach, CA (US)

(73) Assignee: EVOLLVE, INC., Redondo Beach, CA (US)

( * ) Notice: Subject to any disclaimer, the term of this patent is extended or adjusted under 35 U.S.C. 154(b) by 0 days.

(21) Appl. No.: 14/466,748

(22) Filed: Aug. 22, 2014

(65) Prior Publication Data

US 2015/0057805 A1 Feb. 26, 2015

Related U.S. Application Data

(60) Provisional application No. 61/888,344, filed on Oct. 8, 2013, provisional application No. 61/869,566, filed on Aug. 23, 2013.

(51) Int. Cl.
*A63H 18/16* (2006.01)
*A63H 17/36* (2006.01)
(Continued)

(52) U.S. Cl.
CPC ............. *A63H 18/16* (2013.01); *A63H 17/36* (2013.01); *B25J 9/1684* (2013.01); *B25J 9/1697* (2013.01); *G06F 3/041* (2013.01); *Y10S 901/01* (2013.01); *Y10S 901/47* (2013.01)

(58) Field of Classification Search
CPC ..... A63H 18/16; A63H 17/36; B25J 9/1684; B25J 9/1697; G06F 3/041
See application file for complete search history.

(56) References Cited

U.S. PATENT DOCUMENTS 6,690,156 B1 * 2/2004 Weiner ...................... G01S 5/02
273/237
8,702,512 B2 * 4/2014 Mineur ............... A63F 3/00643
345/173

(Continued)

OTHER PUBLICATIONS

Yu et al. "TUIC: Enabling Tangible Interaction on Capacitive Multi-Touch Display." *CHI* 2011. Vancouver, British Colombia, Canada (May 7-12, 2011). 10 pages.

(Continued)

*Primary Examiner* — Nicholas Kiswanto
(74) *Attorney, Agent, or Firm* — Blakely Sokoloff Taylor & Zafman LLP

(57) ABSTRACT

The robotic activity system described herein provides for efficient communications between the robotic device and the board without the establishment of a wired or radio-frequency connection. In particular, through the simulation of touch events by the robotic device on the touch display of the board using capacitive elements on the robotic device, information/data may be communicated from the robotic device to the board, including the location of the robotic device relative to the touch display, the orientation of the robotic device relative to the touch display, status information of the robotic device (e.g., battery level, motor voltages, or wheel speed), and/or other similar pieces of information. Since this information is communicated using the conductive elements, a dedicated data connection, including separate radios and/or interfaces, is not needed. This communicated information may be used for conducting an interactive game involving the robotic device and the board or another activity.

8 Claims, 10 Drawing Sheets

(51) Int. Cl.
  *B25J 9/16* (2006.01)
  *G06F 3/041* (2006.01)

(56) References Cited

U.S. PATENT DOCUMENTS

| | | | | |
|---|---|---|---|---|
| 8,988,087 | B2* | 3/2015 | Uzelac | G01R 31/28 324/658 |
| 9,041,659 | B2* | 5/2015 | Perski | G06F 3/041 178/18.03 |
| 2004/0195767 | A1* | 10/2004 | Randall | A63F 3/00643 273/237 |
| 2009/0167727 | A1 | 7/2009 | Liu et al. | |
| 2010/0053120 | A1 | 3/2010 | Chang et al. | |
| 2013/0065482 | A1* | 3/2013 | Trickett | A63H 11/00 446/397 |
| 2013/0288560 | A1 | 10/2013 | Abou-Hamda | |

OTHER PUBLICATIONS

"Visible Light Communication." http://en.wikipedia.org/wiki/Visible_light_communication. 4 pages.

\* cited by examiner

ROBOTIC ACTIVITY SYSTEM USING POSITION SENSING

CROSS-REFERENCE TO RELATED APPLICATIONS

This application claims the benefit of the earlier filing date of U.S. Provisional Application No. 61/869,566, filed Aug. 23, 2013 and U.S. Provisional Application No. 61/888,344, filed Oct. 8, 2013.

FIELD

A system is described that continually determines the location and orientation of a robotic device moving across the surface of a board using a simulated capacitive touch. Other embodiments are also described herein.

BACKGROUND

Portable electronic devices may be equipped with a touch panel that rests on top of or is otherwise integrated with a digital display device. The touch panel allows a user to provide inputs to the electronic device by touching the display with one or more fingers. For example, a projected capacitive touch (PCT) display utilizes a conductive layer of X-Y grid electrodes that are evenly spaced under a glass layer of the display device. A uniform voltage is applied across the grid of electrodes and when a human finger touches the display, a measurable change in the electric filed is detected in the grid of electrodes adjacent to the touched area such that the touch event is registered with the electronic device. The touch display may also register movements as a finger of the user moves across the display (e.g., a swipe movement/gesture instigated by a finger of a human user).

However, these display systems are restricted to primarily be used with human fingers since other objects are not conductive such that the electric field of electrodes may be altered with contact. Accordingly, other devices that come into contact with the touch display or move across the touch display are not detected by the electronic device. This lack of sensitivity or the ability to detect non-human movements/interactions prevents touch displays from being effectively used along with non-human objects or traditionally non-conductive objects.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A robotic activity system, which includes a board and a robotic device, is described herein. The board may include a digital touch display and the robotic device may include electrical mechanical mechanisms for allowing the device to autonomously move across a surface of the touch display. Using one or more capacitive elements integrated within the robotic device to simulate touch events, the robotic device may pass information to the board, including the position and orientation of the robotic device, while moving across the touch display. Since the robotic device may move without direct control by the board, passing information regarding the position and/or orientation of the robotic device while in movement may be critical for the performance of an interactive game or activity involving the robotic device and the board.

The robotic activity system described herein provides for efficient communications between the robotic device and the board without the establishment of a wired or radio-frequency connection. In particular, through the simulation of touch events by the robotic device on the touch display of the board, information/data may be communicated from the robotic device to the board, including the location of the robotic device relative to the touch display, the orientation of the robotic device relative to the touch display, status information of the robotic device (e.g., battery level, motor voltages, or wheel speed), sensor data (e.g., data from the sensors 309, data from an accelerometer, and data from a thermometer), and/or other similar pieces of information. Since this information is communicated using the conductive elements, a dedicated data connection, including separate radios and/or interfaces, is not needed between the robotic device and the board. As noted above, this communicated information may be used for conducting an interactive game involving the robotic device and the board or another activity.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
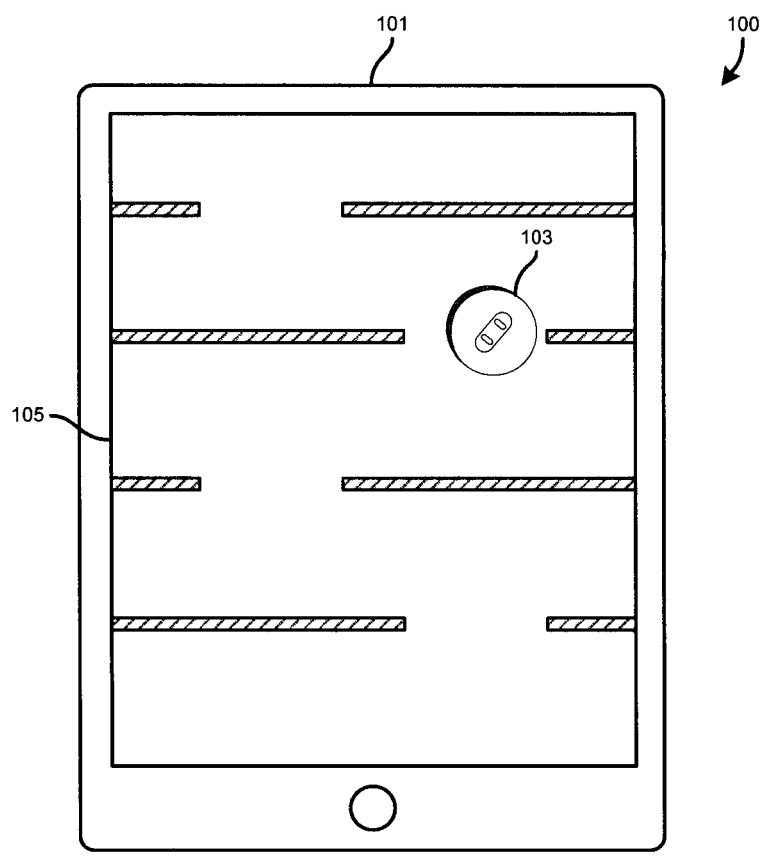
FIG. 1 shows a robotic activity system, including a robotic device and a board, according to one embodiment.

FIG. 1 shows a robotic activity system 100 according to one embodiment. As shown, the robotic activity system 100 includes a board 101 and a robotic device 103. As will be described in greater detail below, the board 101 may include a digital touch display device 105 and the robotic device 103 may include electrical mechanical mechanisms for allowing the device 103 to autonomously move across a surface of the touch display device 105. Using a capacitive touch simulator integrated within the robotic device 103, the robotic device 103 may pass information to the board 101, including the position and orientation of the robotic device 103 while moving across the touch display device 105. Each element of the robotic activity system 100 will be described below by way of example.

Figure 2A:
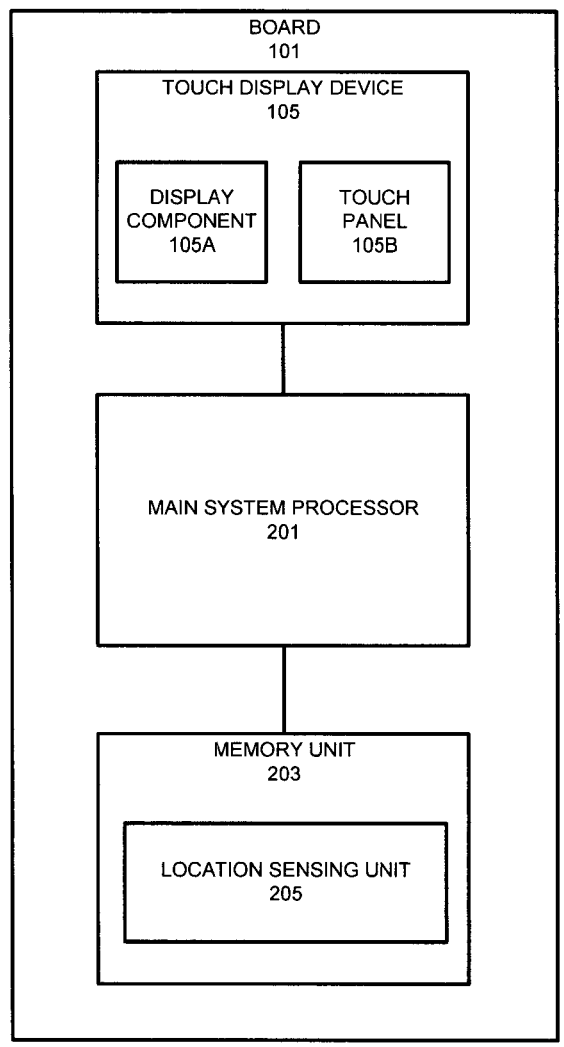
FIG. 2A shows a component diagram of the board according to one embodiment.

In one embodiment, the board 101 may be any apparatus that includes a touch display device 105. For example, in some embodiments, the board 101 may be a computing device (e.g., a tablet computer or a mobile phone). FIG. 2A shows a component diagram of the board 101 according to one embodiment. As shown, the board 101 may include a main system processor 201 and a memory unit 203. The processor 201 and memory unit 203 are used here to refer to any suitable combination of programmable data processing components and data storage that conduct the operations needed to implement the various functions and operations of the board 101. The processor 201 may be a special purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the memory unit 203 may refer to microelectronic, non-volatile random access memory. An operating system may be stored in the memory unit 203, along with application programs specific to the various functions of the board 101, which are to be run or executed by the processor 201 to perform the various functions of the board 101.

As noted above, the board 101 may also include a touch display device 105. The touch display device 105 may include a display component 105A, which is used to display graphics and text to a user, and a touch panel 105B, which is used to receive touch inputs. The display component 105A may utilize any display technology. For example, the display component 105A may be a liquid crystal display (LCD), a plasma display, a light emitting diode (LED) display, an organic LED (OLED) display, or any other similar electronic display device that is capable of dynamically displaying graphics and/or text.

Figure 2B:
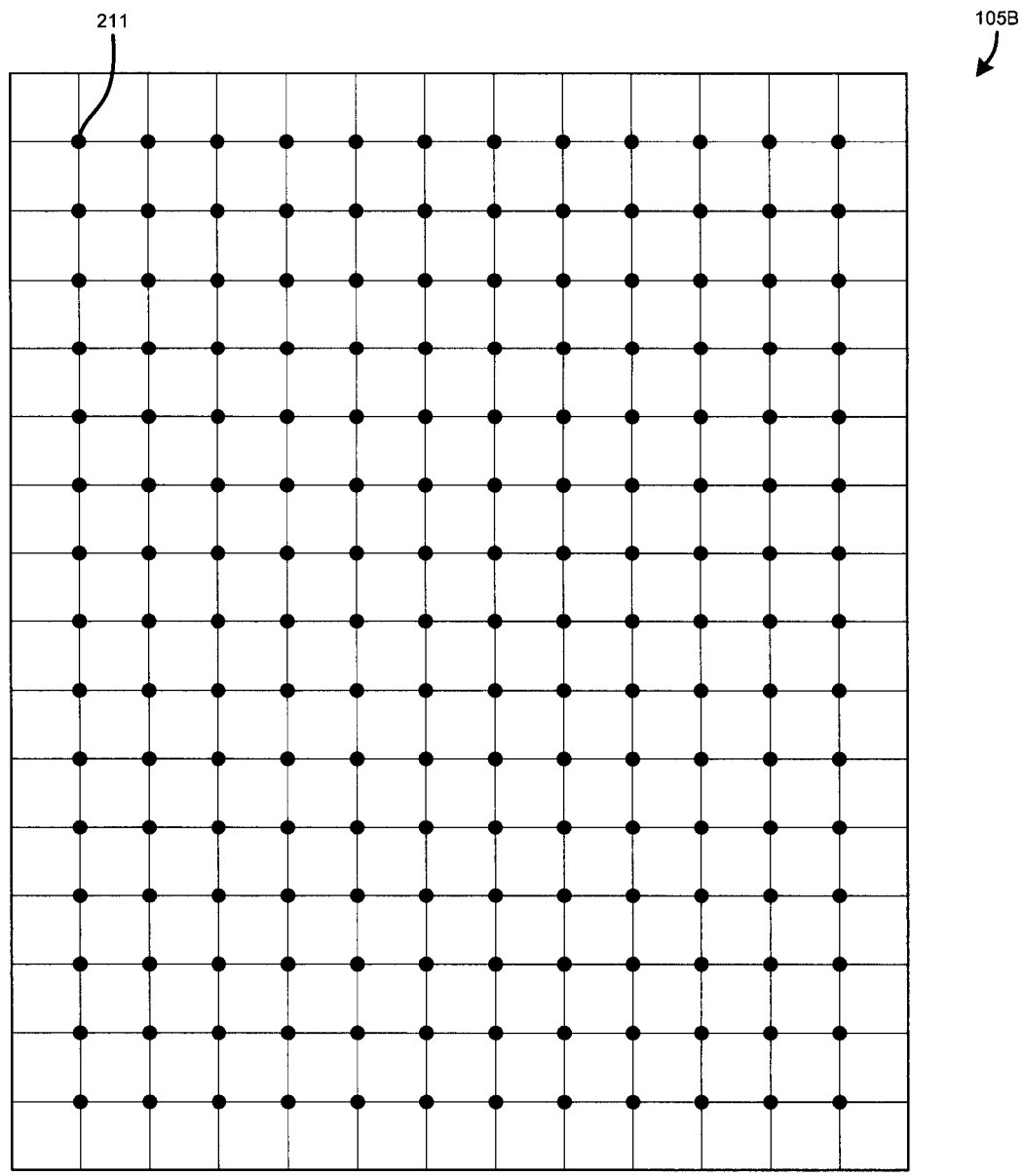
FIG. 2B shows a layout of electrodes on a touch panel of the board according to one embodiment.

The touch panel 105B may be any device that may detect touch inputs/events. For example, the touch panel 105B may be a capacitive touch panel, such as a surface capacitance panel or a projected capacitive touch (PCT) panel. When the touch panel 105B is a PCT panel, the touch panel 105B may include an X-Y grid of electrodes 211 as shown in FIG. 2B. The grid of electrodes 211 may be formed by etching two perpendicular layers of conductive materials with parallel lines across a substrate. An exposed glass layer may be formed/placed on top of the grid of electrodes 211. A constant and uniform voltage may be applied across each of the electrodes 211 and when a capacitive circuit contacts an electrode 211, a change in capacitance to the contacted electrode 211 and/or surrounding electrodes 211 may be caused. This change in capacitance to one or more electrodes 211 may be detected and recorded as the location of a touch event.

Traditionally, these touch events may be instigated by the finger of a user touching or otherwise coming into contact with the touch panel 105B. In particular, a finger of a user may act as a capacitive circuit and change the capacitance of an electrode 211 or a set of electrodes 211 upon touch of the panel 105B. As the user drags their finger across the panel 105B, changes of capacitance levels across corresponding electrodes 211 are detected as a movement touch event (e.g., a gesture). As will be described in greater detail below, a set of conductive elements may be integrated within the robotic device 103 and may simulate capacitive touches on the touch panel 105B. As the robotic device 103 moves across the touch panel 105B, the board 101 may track movement and orientation information for the robotic device 103 through simulated capacitive touches that alter the capacitance of electrodes 211. Further, other information regarding the robotic device 103 may be communicated to the board 101 using the conductive elements as will be detailed below.

In one embodiment, a location sensing unit 205 located in the memory unit 203 and run/executed by the processor 201 may detect and record readings, including touch events, from the touch panel 105B. In this embodiment, the location sensing unit 205 may use the detected readings for tracking the robotic device 103 along with board 101. For example, the location sensing unit 205 may implement a game or another pastime activity (e.g., a maze, a line tracking game, etc.). In this example, the location, orientation, and/or other information regarding the robotic device 103 may be used by the location sensing unit 205 for conducting and/or implementing the game. These games and activities may be performed without the user directly moving the robotic device 103. Accordingly, the robotic device 103 may traverse the virtual environment presented by the display component 105A without interaction from a human user.

In some embodiments, the robotic activity system 100 may include multiple boards 101 that may be traversed by the robotic device 103. For example, the robotic activity system 100 may include a set of boards 101 that are adjacent to each other and joined together such that the robotic device 103 may seamlessly move/roll between boards 101. In this embodiment, location sensing units 205 running on each board 101 may be used for detecting and recording the location, orientation, and/or other information regarding the robotic device 103 conveyed to the boards 101 through conductive elements of the robotic device 103.

Figure 3A:
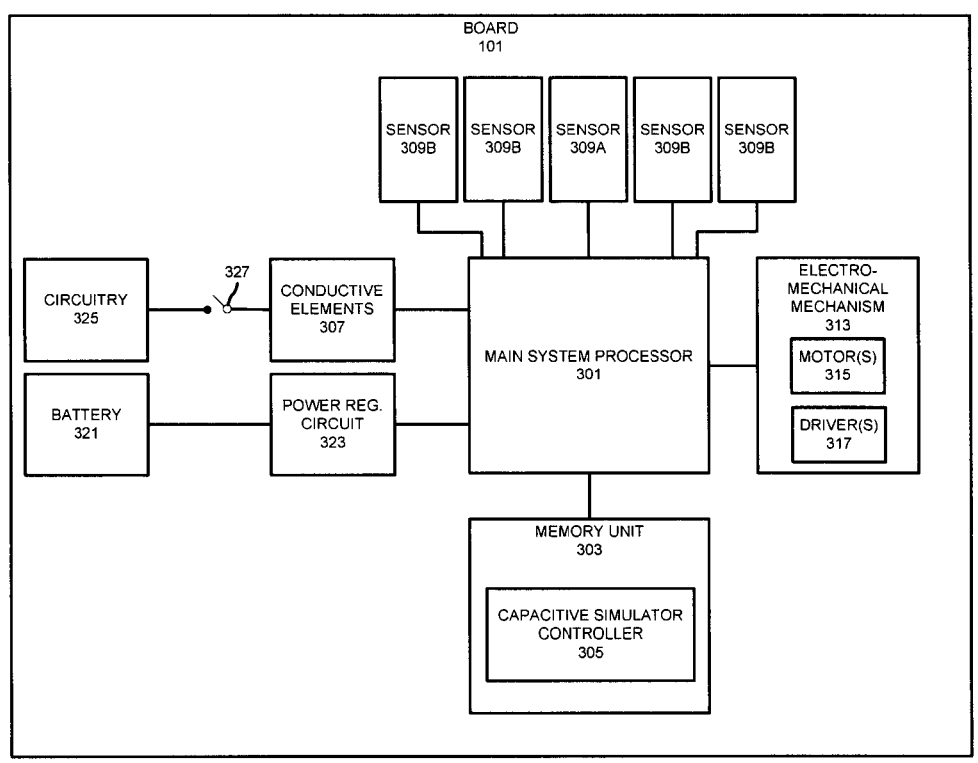
FIG. 3A shows a component diagram of the robotic device according to one embodiment.

The robotic device 103 may be any device that uses an electro-mechanical mechanism to move across a surface of the board 101 while conveying location, orientation, and/or other information to the board 101 using conductive elements. For example, FIG. 3A shows a component diagram of the robotic device 103 according to one embodiment. As shown, the robotic device 103 may include a main system processor 301 and a memory unit 303. Similar to the processor 201 and the memory unit 203 of the board 101, the processor 301 and the memory unit 303 are used here to refer to any suitable combination of programmable data processing components and data storage that conduct the operations needed to implement the various functions and operations of the robotic device 103. The processor 301 may be a special purpose processor such as ASIC, a general purpose microprocessor, a FPGA, a digital signal controller, or a set of hardware logic structures (e.g., filters, arithmetic logic units, and dedicated state machines) while the memory unit 303 may refer to microelectronic, non-volatile random access memory. An operating system may be stored in the memory unit 303, along with application programs specific to the various functions of the robotic device 103, which are to be run or executed by the processor 301 to perform the various functions of the robotic device 103. For example, a capacitive simulator controller 305 may be stored in the memory unit 303 and be run/executed by the processor 301. The capacitive simulator controller 305 may cause one or more conductive elements 307 to simulate capacitive touches in relation to the touch panel 105B of the board 101. The capacitive touches may be triggered in a particular sequence or at a particular frequency by the capacitive simulator controller 305 to convey information to the board 101 as will be described in greater detail below. Although described as being dynamically triggered by the capacitive simulator controller 305, in other embodiments the one or more conductive elements 307 may be static elements that simulate capacitive touches without control by the capacitive simulator controller 305.

Though shown as operating from the memory unit 303, in other embodiments, the capacitive simulator controller 305 may operate using one or more digital or analog filters and circuits implemented within the robotic device 103. Accordingly, the capacitive simulator controller 305 is not restricted to software executed by the main system processor 301, but instead may also be implemented as a set of hardware circuitry.

Figure 3B:
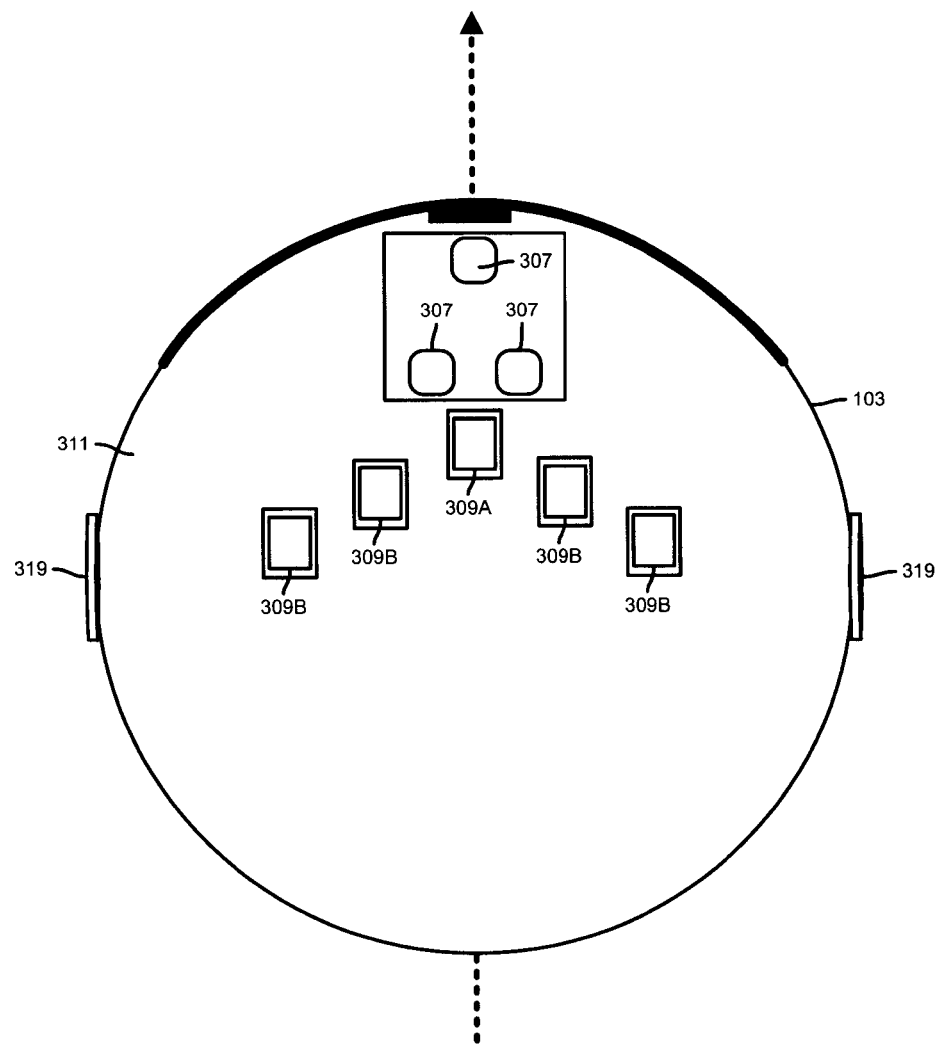
FIG. 3B shows a bottom surface of the robotic device according to one embodiment.

In some embodiments, the robotic device 103 may include a set of sensors 309, which may be used for traversing objects and/or detecting color patterns shown on the display component 105A. For example, the sensors 309 may include a color sensor 309A and multiple light sensors 309B. The color sensor 309A may be a photoresistor or phototransistor that is capable of measuring both the intensity and the wavelength of detected light. In contrast, the light sensors 309B may be photoresistors or phototransistors that measure the intensity of light. The measurement/sensor data from the sensors 309 may be received by the processor 301 and/or an application running on the processor 301 for further processing. The sensors 309 may operate in the visible light spectrum to detect visible light produced by the board 101. In one embodiment, the sensors 309 may be used for traversing a line, a maze, a game board, or another virtual environment shown on the display component 105A in an autonomous fashion. As used herein, autonomous operation indicates that the robotic device 103 moves entirely based on sensor 309 data and stored logic within the robotic device 103. Accordingly, movement of the autonomous robotic device 103 on the board 101 is without interaction and/or inputs from a human user. Although described as moving in relation to a line or a maze, in other embodiments, the robotic device 103 may generally move about the board either searching for an object or in an otherwise random fashion. FIG. 3B shows a bottom surface 311 of the robotic device 103 according to one embodiment. As shown, the bottom surface 311 includes the sensors 309 in a "V" formation; however, in other embodiments the sensors 309 may be arranged in a different formation. For example, the sensors 309 may be arranged linearly and one or more of the sensors 309 may be arranged along a center point of rotation for the robotic device 103. In some embodiments, more or less sensors 309 may be used by the robotic device 103. Accordingly, the number and formation of the sensors 309 shown in FIG. 3B is purely for illustrative purposes.

As shown in FIG. 3A, the robotic device 103 may also include an electro-mechanical mechanism 313 to propel the robotic device 103 across the board 101. The electro-mechanical mechanism 313 may include one or more electric motors 315 and drivers 317. In this embodiment, the drivers 317 may be controlled by the processor 301 and/or an application running on the processor 301 to apply a voltage via the battery regulation circuit 323 and battery 321 to a corresponding motor 315 and wheel 319 for propelling the robotic device 103 at a desired speed and in a desired direction. For example, a higher voltage may be applied to a motor 315 controlling a left wheel 319 in comparison to a voltage applied to a motor 315 controlling a right wheel 319 to cause the robotic device 103 to turn left, while a higher voltage may be applied to a motor 315 controlling a right wheel 319 in comparison to a voltage applied to a motor 315 controlling a left wheel 319 to cause the robotic device 103 to turn right. In some embodiments, pulse-width modulation (PWM) may be used by the drivers 317 for controlling the motors 315. The decision on how to drive the one or more electrical motors 315 may be based on data received from the sensors 309 such that the robotic device 103 may traverse a line, a maze, a game board, or another virtual environment shown on the display component 105A.

In one embodiment, the electro-mechanical mechanism 313 may provide status information for the motors 315. For example, the electro-mechanical mechanism 313 may provide voltage and/or speed information for the motors 315, which may be transferred to the board 101 as will be described in greater detail below.

As noted above, the robotic device 103 may include a battery 321 and a power regulation circuit 323. The power regulation circuit 323 may control the distribution of power transferred from the battery 321 to one or more elements of the robotic device 103 (e.g., the motors 315). In some embodiments, the power regulation circuit 323 may also control the charging of the battery 321 and provide battery status information, including a charge level.

Figure 3C:
FIG. 3C shows a side view of the robotic device moving across a surface of the touch panel according to one embodiment.

As noted above, the robotic device 103 may include one or more conductive elements 307. The conductive elements 307 may be any electrically conductive device that simulates the capacitive properties necessary to register a touch event on a capacitive screen (i.e., the touch panel 105B). In one embodiment, the conductive elements 307 may be positioned on the bottom surface 311 of the robotic device 103 to contact the display device 105 as the robotic device 103 moves across the display device 105 using the electro-mechanical mechanism 313 and the wheels 319. For example, as shown in FIG. 3C, the conductive elements 307 may drag, rub, scrape, or otherwise be in contact with the display device 105/touch panel 105B while the robotic device 103 is on the board 101.

In one embodiment, the conductive elements 307 may be connected to pieces of circuitry 325 within the robotic device 103. For example, the circuitry 325 may include one or more integrated coils. Upon the conductive elements 307 coming into contact or being in close proximity with one or more electrodes 211 of the touch panel 105B, the integrated coils may conduct current away from these electrodes 211 via the conductive elements 307. In another embodiment, the conductive elements 307 may be made of a magnetic material or are conductive and are connected to an integrated magnetic element of the circuitry 325 that establishes a capacitive coupling with one or more electrodes 211 to draw current away from these electrodes 211 upon contact or upon being in close proximity. Accordingly, these embodiments provide simulated capacitive touches using statically arranged circuits. In particular, the conductive elements 307 may be statically coupled to corresponding circuitry 325 (e.g., coils and/or magnetic components) that draw current away from electrodes 211. Thus, these static circuits may not be toggled on/off and may always draw current when proximate or in contact with electrodes 211 of the touch panel 105B.

In another embodiment, the conducting elements 307 may be connected to the circuitry 325 via a modulating circuit 327. For example, the circuitry 325 in this embodiment may include an integrated grounded battery-powered circuit that together with the modulating circuit 327 is capable of creating periodic touch events by conducting current away from electrodes 211 of the touch panel 105B. In particular, the capacitive simulator controller 305 may toggle the modulating circuit 327 between "open" and "closed" positions. In a "closed" position, the circuitry 325 (e.g., the integrated grounded battery-powered circuit) may draw current from electrodes 211 via the conducting elements 307 to simulate a touch event. However, in an "open" position the modulating circuit 327 prevents the circuitry 325 from drawing current from electrodes 211 even when electrodes 211 are in contact with one or more conducting elements 307. In this embodiment, the ability to generate a sequence of touch events with certain timing/frequency properties and combinations of touch points enables the communication of not only the precise position and rotation of the robotic device 103, but also other properties and parameters of the robotic device 103. For example, the robotic device 103 may communicate a battery 321 charge level, a speed/voltage levels for the motors 315, data from an accessory of the robotic device 103, and/or raw or statically processed sensor data (e.g., data from the sensors 309, data from an accelerometer, and data from a thermometer) through proper modulation of touch events according to an established protocol between the robotic device 103 and the board 101.

Figure 3D:
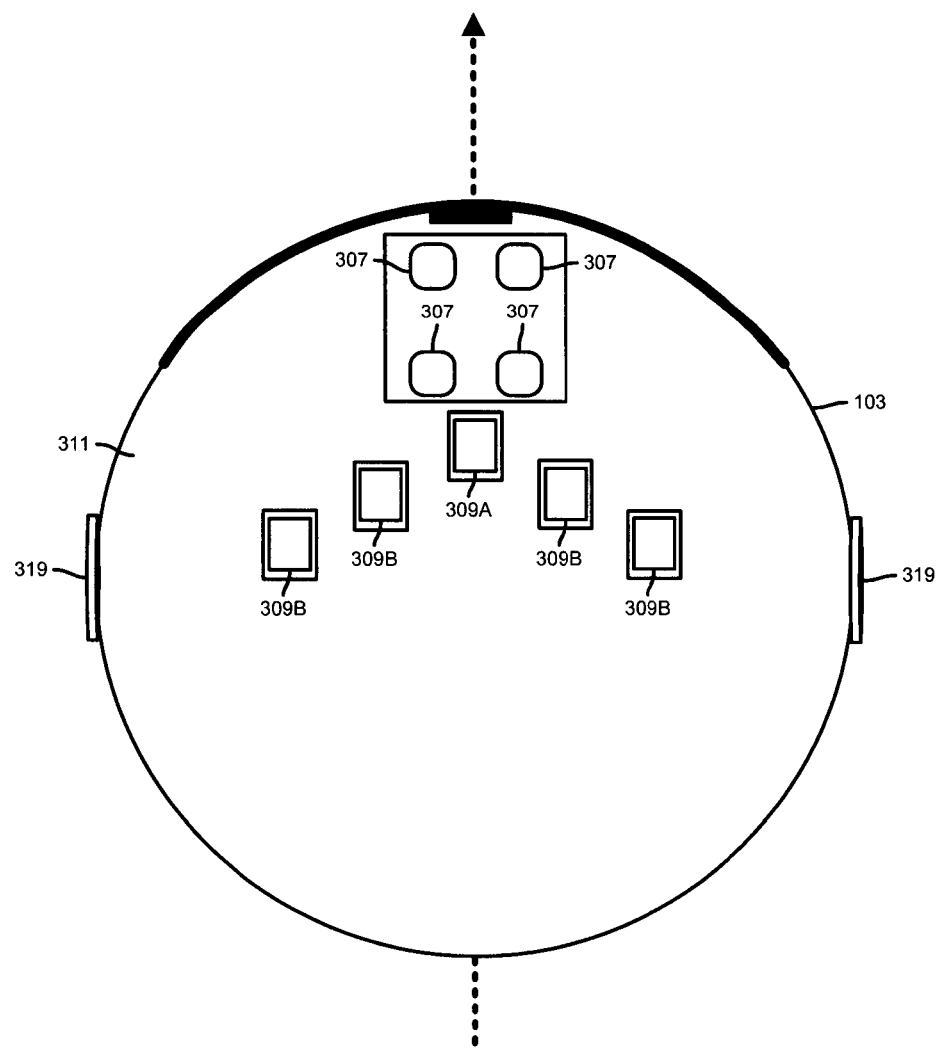
FIG. 3D shows a bottom surface of the robotic device according to another embodiment.

In one embodiment, any number of conducting elements 307 with corresponding modulating circuits 327 and circuitry 325 may be integrated within the robotic device 103. As shown in FIG. 3B, three conducting elements 307 are located on the bottom surface 311 of the robotic device 103. The conducting elements 307 may be arranged to uniquely identify the robotic device 103. For example, in some robotic activity systems 100, multiple robotic devices 103 may be placed on the board 101 at the same time or during different time periods. In this embodiment, each of the robotic devices 103 may have a different number and/or arrangement of conducting elements 307 on the surface 311 of the robotic device 103. The arrangement and the number of conducting elements 307 may uniquely identify each robotic device 103 while moving along the board 101. For example, FIG. 3D shows a robotic device 103 according to another embodiment. As shown in FIG. 3D, the robotic device 103 includes four conductive elements 307 on the bottom surface 311. When placed on the board 101, these four conductive elements 307 may make four corresponding simulated capacitive touches by coming into contact or being in close proximity to corresponding electrodes 211. In comparison, the robotic device 103 shown in FIG. 3B may make three distinct simulated capacitive touches using the three conductive elements 307 shown. Accordingly, the robotic device 103 of FIG. 3D may be uniquely identified by the board 101 in relation to the robotic device 103 of FIG. 3B by the number of conductive elements 307.

Figure 3E:
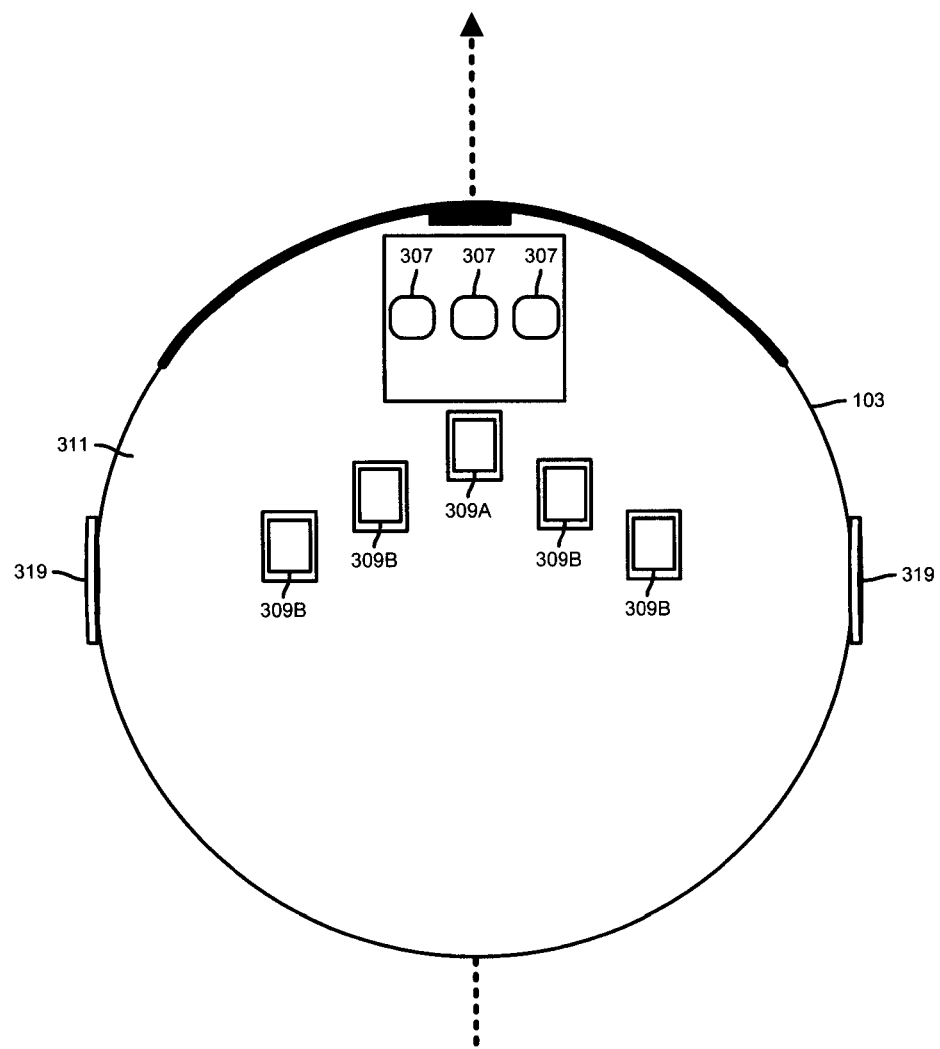
FIG. 3E shows a bottom surface of the robotic device according to still another embodiment.

Similarly, the positioning of conductive elements 307 and the corresponding distances and orientations between electrodes 211 in contact with these conductive elements 307 may be used for uniquely identifying robotic devices 103. For instance, the robotic device 103 shown in FIG. 3E has three conductive elements 307 arranged linearly. In comparison, the three conductive elements 307 shown in FIG. 3B are arranged in a triangle formation. This difference in formation may be detected by the board 101 by a corresponding formation of electrodes 211 with altered capacitance levels. Accordingly, the robotic device 103 of FIG. 3E may be uniquely identified by the board 101 in relation to the robotic device 103 of FIG. 3B by the formation of conductive elements 307 instead of merely the number of conductive elements 307 in contact with electrodes 211.

In one embodiment, the orientation of the robotic device 103 may be determined based on the formation of the conductive elements 307. For example, the triangle formation of the conductive elements 307 shown in FIG. 3B may be isosceles such that the shortest unique length of the isosceles triangle formation may be perpendicular to the direction of movement of the robotic device 103 (denoted by the dashed arrow). This isosceles formation of the conductive elements 307 may be detected by a corresponding formation of electrodes 211 with altered capacitance on the board 101. The formation of electrodes 211 corresponding to the conductive elements 307 of the robotic device 103 may therefore indicate the orientation of the robotic device 103 relative to the board 101.

Figure 3F:
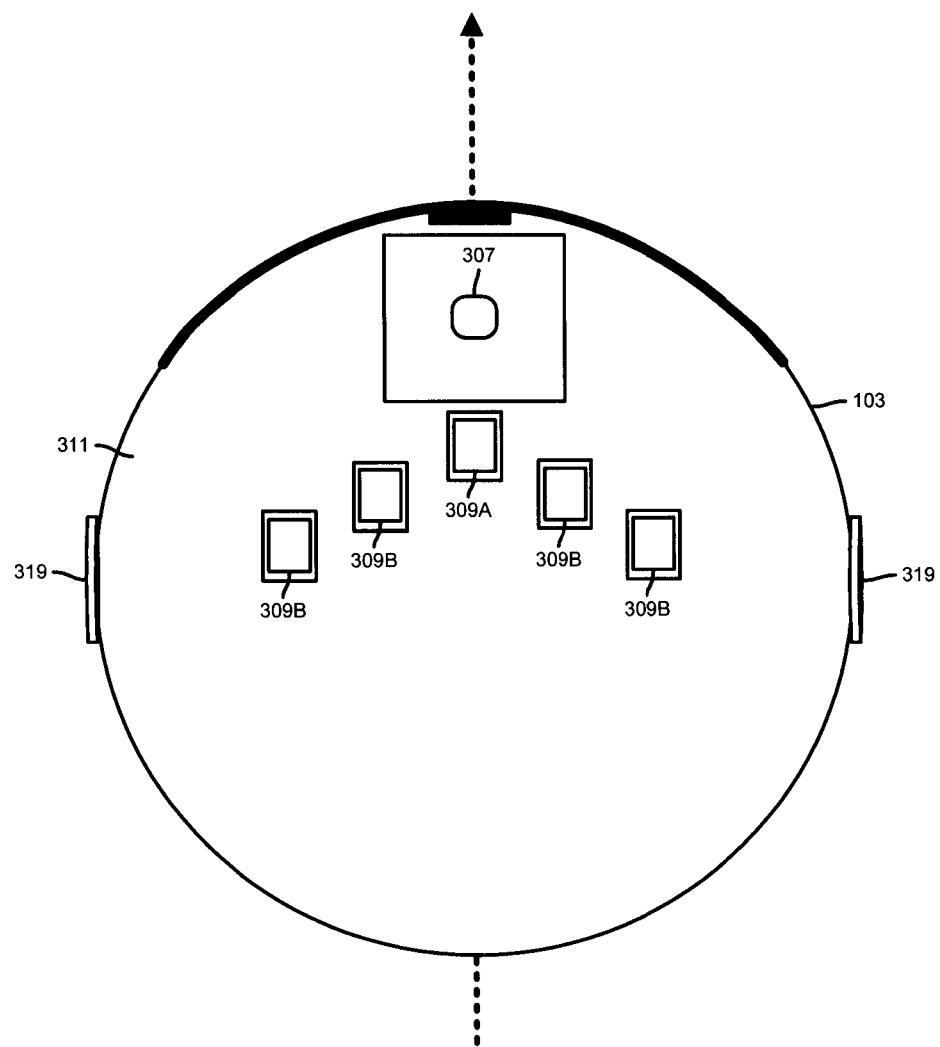
FIG. 3F shows a bottom surface of the robotic device according to yet another embodiment.

In some embodiments, the robotic device 103 may include a single static conductive element 307 as shown in FIG. 3F. Although the single conductive element 307 may not uniquely identify the robotic device 103 to the board 101, the board 101 may still detect the single static conductive element 307 as the robotic device 103 autonomously moves about the board 101.

Although described in relation to separate static and dynamic conductive elements 307 structures/circuits, in some embodiments, a robotic device 103 may include both static and dynamic conductive elements 307. Accordingly, the robotic device 103 may communicate location, orientation, and other information to the board 101 simultaneously using static and dynamic conductive elements 307.

Figure 4:
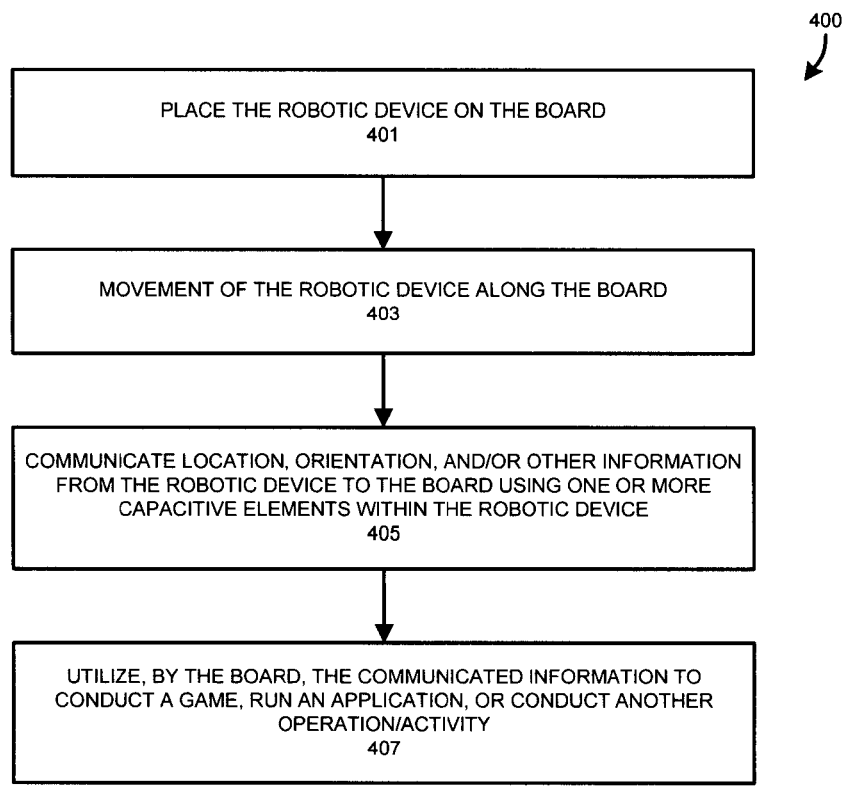
FIG. 4 shows a method for providing communications between the robotic device and the board while the robotic device is moving along the board according to one embodiment.

Turning now to FIG. 4, a method 400 for providing communications between the robotic device 103 and the board 101 while the robotic device 103 is moving along the board 101 will be described. Each operation of the method 400 may be performed by one or more of the robotic device 103 and the board 101. For example, as noted above, the robotic device 103 may include a capacitive simulator controller 305. As shown in FIG. 3A, the capacitive simulator controller 305 may be stored in the memory unit 303 and run/executed by the main system processor 301. However, in other embodiments, the capacitive simulator controller 305 may be implemented using a set of hardware elements and circuits.

Although shown and described in a particular order, in some embodiments the operations of the method 400 may be performed in a different order. For example, in some embodiments, two or more operations of the method 400 may be performed concurrently or in partially overlapping time periods.

The method 400 may commence at operation 401 with the robotic device 103 being placed on the board 101 such that the robotic device 103 may be ready to autonomously move around on the board 101. For example, in one embodiment, the robotic device 103 may be placed on the board 101 such that the bottom surface 311 is facing/parallel the board 101 and the wheels 319 are in contact with the display device 105 of the board 101. In this embodiment, the one or more conductive elements 307 of the robotic device 103 may be positioned at operation 401 to be in contact with the display device 105 or in close proximity to the display device 105

(e.g., between 0.5 millimeters and 2.0 millimeters from the display device 105). In this fashion, the conductive elements 307 may be positioned to conduct current away from or more electrodes 211 of the touch panel 105B upon coming into contact or being in proximity to these electrodes 211.

At operation 403, the robotic device 103 may move around on the display device 105. This movement may be facilitated using the electro-mechanical mechanism 313. In particular, the electro-mechanical mechanism 313 may turn the wheels 319 to move the robotic device 103 along a surface of the display device 105. The movement may be in two-dimensions along the surface of the display device 105 and may include in-place rotations of the robotic device 103 (i.e., 90°, 180°, 270°, or 360°). In some embodiments, the robotic device 103 may move at a variable speed. For example, the robotic device 103 may initially move at 3.0 centimeters/second across the board 101 during a first period and thereafter increase in speed to 6.0 centimeters/second during a second period.

In one embodiment, the robotic device 103 may autonomously move at operation 403 based on data from the sensors 309 and/or rules of a game or another activity implemented by the location sensing unit 205. For example, the sensors 309 may detect elements of a maze or tiles of a game shown on the display device 105. Based on this sensor data and a set predefined rules corresponding to the game/activity, the robotic device 103 may move appropriately along the display device 105 and consequently along the virtual environment shown on the display device 105 (e.g., move through a maze, along a game board, or down a tracked line). In some embodiments, movement along the display device 105 may be random and without interaction from a human user. For example, upon detection of an intersection along a line or within a maze shown on the display device 105, the robotic device 103 may randomly decide a direction of movement. Accordingly, movement of the robotic device 103 at operation 403 may be autonomous (i.e., without interaction by a user), but partially based on predefined rules and readings from the sensors 309. Thus, the location and orientation of the robotic device 103 may be difficult to estimate based on the various variables and random factors which may affect movement of the device 103.

At operation 405, the robotic device 103 may communicate information/data to the board 101 using simulated touch events. In this embodiment, the information may include the location of the robotic device 103, orientation of the robotic device 103, a unique identifier of the robotic device 103, a charge state of a battery 321 of the robotic device 103, voltage levels at the motors 315, wheel 319 speed, data from an accessory of the robotic device 103, raw or statically processed sensor data (e.g., data from the sensors 309, data from an accelerometer, and data from a thermometer), and/or any other piece of information. The robotic device 103 may communicate this information while the robotic device 103 is moving along the display device 105 or while the robotic device 103 is motionless on the display device 105. In some embodiments, data may be communicated at operation 405 at a prescribed interval (e.g., every three seconds the robotic device 103 may communicate position, orientation, and/or a charge state of a battery 321 to the board 101).

In one embodiment, communication of information at operation 405 may be performed using the conductive elements 307, the circuitry 325, the modulating circuit 327, and/or the capacitive simulator controller 305. For example, the conductive elements 307, as noted above, may be positioned to contact or be in close proximity to the display device 105 as the robotic device 103 moves across the display device 105. In this embodiment, the conductive elements 307 may draw current away from one or more proximate electrodes 211 using various circuit elements to simulate touch events. The circuit elements (e.g., the conductive elements 207 and the circuitry 325) may be static elements that are not adjustable or configurable as the robotic device 103 is operating on the board 101. In these embodiments, as described above, the robotic device 103 may communicate the position, orientation, and a unique identifier of the robotic device 103 to the board 101 using the conductive elements 307 and static circuit elements.

In other embodiments, the conductive properties of the conductive elements 307 may be dynamically altered to simulate separate touch events. As noted above, a modulating circuit 327 may be managed by the capacitive simulator controller 305 for adjusting the conductive elements' 307 ability to draw current from proximate electrodes 211. For example, the capacitive simulator controller 305 may drive the modulating circuit 327 in an "open" and "closed" sequence that opens and closes a circuit at operation 405. For example, when the modulating circuit 327 is in a "closed" position, the circuitry 325 may draw current from electrodes 211 via the conducting elements 307 to simulate a touch event. However, when the modulating circuit 327 is in a "open" position, the modulating circuit prevents the circuitry 327 from drawing current from electrodes 211, thus preventing a touch event from being triggered/detected.

This dynamic control of the conductive elements 307 may be used for indicating the position, orientation, or identity of the robotic device 103 in a similar fashion as described above. In particular, the capacitive simulator controller 305 may drive the modulating circuit 327 in a unique "open" and "closed" sequence that produces a corresponding unique sequence of touch events on the touch panel 105B, which identifies the robotic device 103. In some embodiments, the sequence created by the controller 305 may be across multiple conductive elements 307 and modulating circuits 327. Accordingly, the frequency, timing, and formation of the open and closed sequence for the modulating circuit(s) 327 may result in a corresponding sequence of identical or similar frequency/timed touch events with a formation corresponding to the formation of utilized conductive elements 307. The position of the electrodes 211 affected by this sequence of touch events may also indicate the location of the robotic device 103 relative to the display device 105.

Additionally, the dynamic control of the conductive elements 307 may be used for indicating other pieces of information or data, including a battery 321 charge level, a motor 315 voltage level, a wheel 319 speed, data from an accessory of the robotic device 103, and/or raw or statically processed sensor data (e.g., data from the sensors 309, data from an accelerometer, and data from a thermometer). For example, the capacitive simulator controller 305 may drive the modulating circuit 327 to produce a sequence of touch events that code the battery 321 charge level, motor 315 voltage level, wheel 319 speed, data from an accessory of the robotic device 103, sensor data, or another piece of data. In this embodiment, the protocol/sequence necessary to communicate these levels/values may be predefined prior to execution of the method 400.

At operation 407, the simulated touch events used for communication at operation 405 may be detected and utilized by the board 101. For example, the location sensing unit 205 may track the location of the robotic device 103 across the display device 105 based on a series of touch events detected at different electrodes 211 along the touch panel 105B. The detected touch events may also be used for determining the changing orientation of the robotic device 103 as the device 103 moves across the display device 105. This information may be used to update game play, including a score for the corresponding robotic device 103 or the state for the robotic device 103 (e.g., the robotic device 103 has moved to a level three area on the board 101). In other embodiments, the information communicated at operation 405 may be used by the board 101 at operation 407 to provide status updates to a user. For example, a battery 321 level of the robotic device 103 may be shown on the display device 105 based on a sequence of touch events produced at operation 405 and detected at operation 407 that indicate the battery 321 level.

In one embodiment, the information communicated at operation 405 may be used at operation 407 for altering graphics shown on the touch display device 105 of the board 101. For example, in response to determining that the robotic device 103 is located at a particular point on the touch display device 105, operation 407 may cause the touch display device 105 to show a code at the determined position of the robotic device 103. The code may thereafter be sensed by the robotic device 103 (e.g., using the sensors 309) and a function/movement corresponding to the detected code may be performed by the robotic device 103. For instance, the code may cause the robotic device 103 to speed up such that the device 103 reaches a particular point at a specified time. Accordingly, information received from the robotic device 103 at operation 405 may be used at operation 407 for altering movement of the robotic device 103. In another example, in response to determining that the robotic device 103 is located at a particular point on the touch display device 105, operation 407 may cause the touch display device 105 to extend or alter a line, a maze, or another virtual environment in which the robotic device 103 is traversing.

As described above, the robotic activity system 100 and the method 400 provide for efficient communications between the robotic device 103 and the board 101 without the establishment of a wired or radio-frequency connection. In particular, through the simulation of touch events by the robotic device 103 on a touch panel 105B of the board 101, information/data may be communicated from the robotic device 103 to the board 103, including the location of the robotic device 103 relative to the touch panel 105B, the orientation of the robotic device 103 relative to the touch panel 105B, status information of the robotic device 103 (e.g., battery 321 level), and/or other similar pieces of information. Since this information is communicated using the conductive elements 307, a dedicated data connection, including separate radios and/or interfaces, is not needed between the robotic device 103 and the board 101. This communicated information may be used for conducting an interactive game involving the robotic device 103 and the board 101 or another pastime activity.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An article of manufacture, comprising:
a machine-readable storage medium that stores instructions which, when executed by a processor in a robotic computing device,
determine data to convey from the robotic computing device, with a conductive element, to a touch computing device; and
toggle a modulating circuit between open and closed positions to generate a predefined open and closed sequence, wherein in a closed position the modulating circuit completes a circuit between the conductive element and a set of circuitry that draws current away from an electrode of a touch panel via the conductive element when the conductive element is in proximity to the electrode,
wherein the predefined open and closed sequence codes the data to be conveyed from the robotic computing device to the touch computing device in which the touch panel is integrated while the robotic computing device moves across the touch panel.

2. The machine-readable storage medium of claim 1, wherein the data to be conveyed to the touch computing device includes battery level data, sensor data, accessory data, motor voltage data, and wheel speed data.

3. The machine-readable storage medium of claim 1, wherein the data to be conveyed to the touch computing device includes location data or orientation data of the robotic computing device in relation to electrodes on the touch panel.

4. The machine-readable storage medium of claim 1, wherein the data to be conveyed to the touch computing device includes an identifier of the robotic computing device.

5. The machine-readable storage medium of claim 1, wherein the predefined open and closed sequence is defined by one or more of
1) an order of open and closed positions;
2) a frequency of the open and closed positions;
3) timing between the open and closed positions; and
4) a location of the conductive element in relation to other conductive elements of the robotic computing device.

6. The machine-readable storage medium of claim 1, wherein drawing current from the electrode simulates a touch event for the touch panel, wherein the predefined open and closed sequence generates a corresponding sequence of touch events with the same frequency and timing.

7. The machine-readable storage medium of claim 6, wherein the corresponding sequence of touch events is used by the touch computing device to track status and location information for the robotic computing device for use in an activity involving the robotic computing device variably moving across the touch panel.

8. The machine-readable storage medium of claim 7, wherein the activity involves the robotic computing device traversing a line and without direct interaction by a user.

* * * * *